United States Patent
Schmidt et al.

(10) Patent No.: US 10,330,526 B1
(45) Date of Patent: Jun. 25, 2019

(54) DETERMINING STRUCTURAL TOMOGRAPHIC PROPERTIES OF A GEOLOGIC FORMATION

(71) Applicant: Saudi Arabian Oil Company, Dhahran (SA)

(72) Inventors: Howard K. Schmidt, Dhahran (SA); Jesus Manuel Felix Servin, Dhahran (SA); Frode Hveding, Dhahran (SA); Daniele Colombo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/833,782

(22) Filed: Dec. 6, 2017

(51) Int. Cl.
| | |
|---|---|
| *G01N 21/00* | (2006.01) |
| *G01H 9/00* | (2006.01) |
| *G01V 11/00* | (2006.01) |
| *H02J 7/00* | (2006.01) |
| *G01V 3/26* | (2006.01) |
| *H02N 2/18* | (2006.01) |
| *G01V 1/22* | (2006.01) |

(52) U.S. Cl.
CPC .............. *G01H 9/004* (2013.01); *G01V 11/00* (2013.01); *G01V 1/226* (2013.01); *G01V 3/26* (2013.01); *H02J 7/00* (2013.01); *H02N 2/18* (2013.01)

(58) Field of Classification Search
CPC ........... G01M 11/3109; G01M 11/338; G01M 11/3145; G01M 11/335; G01M 11/33
USPC ........................................................ 356/73.1
See application file for complete search history.

(56) References Cited

U.S. PATENT DOCUMENTS

| | | |
|---|---|---|
| 4,433,291 A | 2/1984 | Yariv et al. |
| 4,589,285 A | 5/1986 | Savit |
| 4,650,281 A | 3/1987 | Jaeger et al. |
| 5,096,277 A | 3/1992 | Kleinerman |

(Continued)

FOREIGN PATENT DOCUMENTS

| | | |
|---|---|---|
| GB | 2442745 | 4/2011 |
| WO | 2004113677 | 12/2004 |

(Continued)

OTHER PUBLICATIONS americanpiezo.com [online], "Stripe Actuators," available on or before Mar. 13, 2011, via Internet Archive: Wayback Machine URL <https ://web.archive.org/web/20110313073802/https://www.americanpiezo.com/standard-products/stripe-actuators.html>, [retrieved on Apr. 6, 2018], retrieved from: URL <https://www.americanpiezo.com/standard-products/stripe-actuators.html>, 2 pages.

(Continued)

*Primary Examiner* — Md M Rahman
(74) *Attorney, Agent, or Firm* — Fish & Richardson P.C.

(57) ABSTRACT

A variable-frequency light source is configured to emit a light beam and modulate a frequency of the light beam. A fiber optic cable is attached to the variable frequency light source. The fiber optic cable is configured to receive the light beam at an inlet and pass the light beam to an exit. Multiple optical detectors are attached to the fiber optic cable. Each of the optical detectors is configured to detect a specified frequency of light that is backscattered through the fiber optic cable. An actuation mechanism is attached to the fiber optic cable. The actuation mechanism is configured to deform the fiber optic cable in response to a stimulus.

9 Claims, 4 Drawing Sheets

(56) References Cited

U.S. PATENT DOCUMENTS

| | | | |
|---|---|---|---|
| 6,380,534 | B1 | 4/2002 | Mahmoud et al. |
| 6,555,807 | B2 | 4/2003 | Clayton et al. |
| 8,661,907 | B2 | 3/2014 | Davis et al. |
| 8,816,689 | B2 | 8/2014 | Colombo et al. |
| 2009/0264768 | A1* | 10/2009 | Courtney ............ A61B 5/0062 600/463 |
| 2010/0200744 | A1 | 8/2010 | Pearce et al. |
| 2012/0092960 | A1 | 4/2012 | Gaston et al. |
| 2014/0036628 | A1 | 2/2014 | Hill et al. |
| 2014/0159715 | A1 | 6/2014 | McEwen-King |
| 2014/0200511 | A1* | 7/2014 | Boyden ................ A61M 37/00 604/67 |
| 2015/0192436 | A1 | 7/2015 | Farhadiroushan et al. |
| 2015/0337874 | A1* | 11/2015 | Park ...................... F15B 15/103 92/5 R |
| 2016/0146662 | A1 | 5/2016 | Stokely et al. |

FOREIGN PATENT DOCUMENTS

| | | |
|---|---|---|
| WO | 2014100275 | 6/2014 |
| WO | 2015020642 | 2/2015 |
| WO | 2017205565 | 11/2017 |

OTHER PUBLICATIONS

Ansari et al., "Design of the fiber optic distributed acoustic sensor based on Michelson interferometer and its location application," Optical Engineering, vol. 42, Oct. 1, 2003, 1 pages, Abstract only.

bayspec.com [online], "SuperGamut NIR Spectrometer," available on or before Feb. 2014, [retrieved Apr. 18, 20180], retrieved from: URL <http://www.bayspec.com/wp-content/uploads/2014/02/BaySpec-Datasheet-nir-swir.pdf>, 6 pages.

Boman, "DAS technology expands fiber optic applications for oil, gas industry," Rigzone, May 4, 2015, 4 pages.

Colombo and McNeice, "Quantifying surface-to-reservoir electromagnetics for waterflood monitoring in a Saudi Arabian carbonate reservoir," Geophysics vol. 78, Issue 6, Nov. 2013, 17 pages.

Jacobs et al., "Downhole fiber-optic monitoring: an evolving technology," Society of Petroleum Engineers, Journal of Petroleum Technology vol. 66, Issue 08, Aug. 2014, 2 pages, Abstract only.

Optasense.com [online], "Oilfield Services," available on or before Jun. 2, 2015, via Wayback Machine URL <https://web.archive.org/web/20150602040413/http://www.optasense.com/our-solutions/oilfield-services/>, [retrieved Apr. 6, 2018], retrieved from URL <http://www.optasense.com/our-solutions/oilfield-services/>, 1 page.

piceramic.com [online], "Rectangular Bending Elements," available on or before Mar. 31, 2017, via Internet Archive: Wayback Machine URL <https://web.archive.org/web/20170331054949/https://www.piceramic.com/en/products/piezoceramic-components/bending-elements/>, [retrieved Apr. 6, 2018], retrieved from: URL <https://www.piceramic.com/en/products/piezoceramic-components/bending-elements/>, 2 pages.

Rio-lasers.com [online], "Redfern Intergrated Optics (RIO) Colorado Tunable Laser Source," available on or before Sep. 1, 2016, via Wayback Machine URL <https://web.archive.org/web/20160901172454/http://www.rio-lasers.com/pdf/Rio_Colorado_Product%20Brief_1.24.14.pdf> [retrieved Apr. 6, 2018], retrieved from URL <http://www.rio-lasers.com/pdf/Rio_Colorado_Product_Brief_1.24.14.pdf>, 2 pages.

Sbl.com [online], "Distributed Acoustic Sensing Technology," avaialble on or before Feb. 11, 2017, via Wayback Machine URL <https://web.archive.org/web/20170211002616/https://www.slb.com/services/characterization/geophysics/wireline/distributed-acoustic-seismic-sensing.aspx>, [retrieved on Apr. 6, 2018], retrieved from URL <https://www.slb.com/services/characterization/geophysics/wireline/distributed-acoustic-seismic-sensing.aspx>, 1 page.

Sedlar et al., "Optical fiber magnetic field sensors with ceramic magnetostrictive jackets," Applied Optics, vol. 35, Issue 27, Sep. 20, 1996, 2 pages, abstract only.

steminc.com [online], "Piezo Ceraminc Plate 26×8×0.7mm 108 KHz," available on or before Dec. 30, 2013, via Internet Archive Wayback Machine URL <https://web.archive.org/web/20131230010212/https://www.steminc.com/PZT/en/piezo-ceraminc-plate-26×8×7mm-108-khz>, [retrieved on Apr. 6, 2018], retrieved from URL <https://www.steminc.com/PZT/en/piezo-ceraminc-plate-26×8×7mm-108-khz>, 1 page.

Udd, "An overview of fiber-optic sensors," Review of Science Instruments 66, 4015, Jun. 1995, 16 pages, Abstract only.

Wikipedia.com [online], "Distributed acoustic sensing", Jan. 17, 2012, [retrieved on Feb. 23, 2018], retrived from URL <https://en.wikipedia.org/wiki/Distributed_acoustic_sensing>, 5 pages.

Yamamoto, "Imaging the permeability structure within the near-surface sediments by acoustic crosswell tomography," Journal of Applied Geophysics, vol. 47, Issues 1, May 2001, 11 pages.

International Invitation to Pay Additional Fees and, Where Applicable, Protest Fee, (PCT Article 173a and Rule 40.1 and 40.2e), issued in International Application No. PCT/US2018/061932 on Jan. 30, 2019, 14 pages.

International Search Report and Written Opinion issued in International Application No. PCT/US2018/061932 dated Apr. 9, 2019, 24 pages.

* cited by examiner

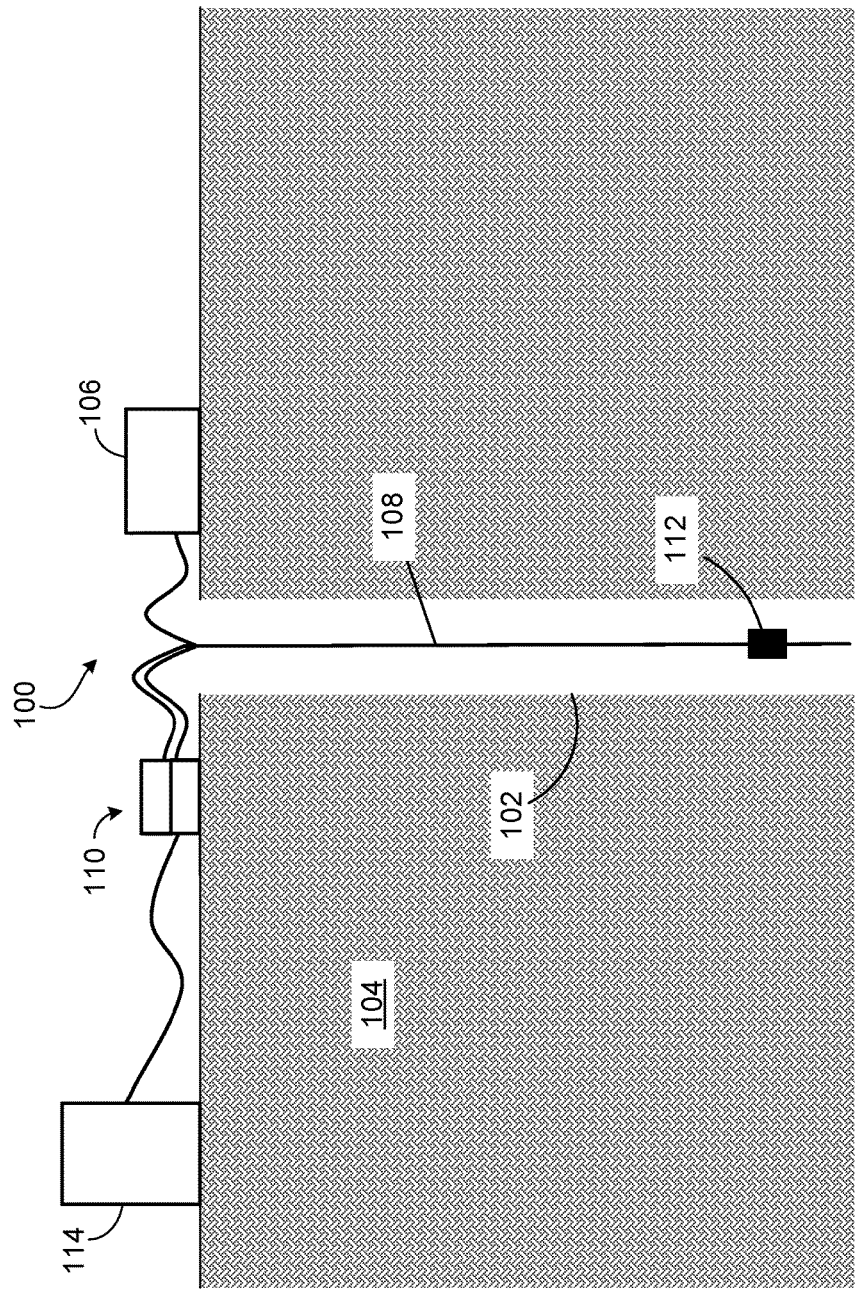

DETERMINING STRUCTURAL TOMOGRAPHIC PROPERTIES OF A GEOLOGIC FORMATION

TECHNICAL FIELD

This disclosure relates to sensors in boreholes.

BACKGROUND

Acoustic detection using optical fibers exploits Rayleigh back-scattering along a fiber from a short pulse of light traversing the fiber. The back-scattering characteristics change if the fiber is moved or deformed even on the micron-scale. Thus, a record of changes in scattering intensity as a function of pulse transit time correspond to movement of the fiber as a function of position along the fiber. This results in a distributed acoustic sensor that can be used for well diagnostics in the oil field on either a temporary or even permanent installed basis. Such fiber based sensors can be used to detect the acoustic signature of small leaks, flows, and bubbles within a wellbore or borehole.

SUMMARY

This disclosure relates to determining structural tomographic properties of a geologic formation.

An example implementation of the subject matter described within this disclosure is a sub-surface detection device with the following features. A variable-frequency light source is configured to emit a light beam and modulate a frequency of the light beam. A fiber optic cable is attached to the variable frequency light source. The fiber optic cable is configured to receive the light beam at an inlet and pass the light beam to an exit. Multiple optical detectors are attached to the fiber optic cable. Each of the optical detectors is configured to detect a specified frequency of light that is backscattered through the fiber optic cable. An actuation mechanism is attached to the fiber optic cable. The actuation mechanism is configured to deform the fiber optic cable in response to a stimulus.

Aspects of the example implementation, which can be combined with the example implementation alone or in combination, include the following. Each of the optical detectors is configured to detect a different frequency of light.

Aspects of the example implementation, which can be combined with the example implementation alone or in combination, include the following. The actuation mechanism includes an antenna configured to detect changes in an electromagnetic field. An electromechanical transducer is connected to the antenna. The electromechanical transducer is configured to deform the fiber optic cable in response to detecting changes in the electromagnetic field.

Aspects of the example implementation, which can be combined with the example implementation alone or in combination, include the following. The electromechanical transducer includes a piezoelectric element.

Aspects of the example implementation, which can be combined with the example implementation alone or in combination, include the following. A filtering circuit is configured to filter out noise detected by the antenna. An amplifier is configured to amplify the filtered signal. An energy storage device is configured to supply power to at least one of the amplifier or the filtering circuit.

Aspects of the example implementation, which can be combined with the example implementation alone or in combination, include the following. The energy storage device includes a battery or capacitor.

Aspects of the example implementation, which can be combined with the example implementation alone or in combination, include the following. The actuation mechanism includes a hydrophilic gel configured to expand in the presence of moisture. A diaphragm is connected to the hydrophilic gel and the fiber optic cable. An expansion in the hydrophilic gel induces the diaphragm to deform the fiber optic cable.

Aspects of the example implementation, which can be combined with the example implementation alone or in combination, include the following. An energy harvesting device is configured to harvest energy from an ambient environment. An energy storage device is configured to store the harvested energy.

Aspects of the example implementation, which can be combined with the example implementation alone or in combination, include the following. The energy harvesting device includes an antenna configured to harvest electromagnetic energy within the borehole. A rectification circuit is coupled to the antenna. The rectification circuit is configured to condition the harvested energy for storage. An energy storage device is coupled to the rectification circuit. The energy storage device is configured to store the harvested energy.

Aspects of the example implementation, which can be combined with the example implementation alone or in combination, include the following. The energy harvesting device includes a piezoelectric device configured to harvest mechanical energy within the borehole. A rectification circuit is coupled to the piezoelectric device. The rectification circuit is configured to condition the harvested energy for storage. An energy storage device is coupled to the rectification circuit. The energy storage device is configured to store the harvested energy.

An example implementation of the subject matter described within this disclosure is a method with the following features. A modulating frequency light beam is directed with a variable frequency light source along a fiber optic cable placed within a borehole. A deformation is induced in the fiber optic cable with a subsurface detection device that is responsive to a specified stimulus. A backscatter of multiple frequencies within the fiber optic cable is detected with multiple optical detectors attached to the fiber optic cable. Each of the optical detectors is configured to detect a specified frequency of light. A physical property of a geologic formation in which the borehole is formed is determined in response to detecting the backscatter of multiple frequencies.

Aspects of the example method, which can be combined with the example method alone or in combination, include the following. Inducing a deformation in the fiber optic cable includes detecting a change in an electromagnetic field with an antenna. The deformation within the fiber optic cable is induced with a transducer coupled to the antenna in response to the change in the electromagnetic field.

Aspects of the example method, which can be combined with the example method alone or in combination, include the following. Inducing a deformation in the fiber optic cable includes expanding a hydrophilic gel in response to a moisture content within the borehole. The deformation within the fiber optic cable is induced with the expanded hydrophilic gel.

Aspects of the example method, which can be combined with the example method alone or in combination, include the following. Energy is harvested from changes in magnetic fields within the borehole with an antenna. The harvested energy is stored within an energy storage device. Equipment within the borehole is powered with the stored energy.

Aspects of the example method, which can be combined with the example method alone or in combination, include the following. Energy is harvested from ambient noise within the borehole with a transducer. The harvested energy is stored within an energy storage device. Equipment within the borehole is powered with the stored energy.

Aspects of the example method, which can be combined with the example method alone or in combination, include the following. The energy storage device includes either a super capacitor or a battery.

An example implementation of the subject matter described within this disclosure is a distributed geophone system with the following features. Multiple sub-surface detection devices are installed within a plurality of boreholes. Each of the sub-surface detection devices includes a variable frequency light source configured to emit a light beam and modulate a frequency of the light beam. A fiber optic cable is attached to the variable frequency light source. The fiber optic cable is configured to receive the light beam. Multiple optical detectors are attached to the fiber optic cable. Each of the optical detectors is configured to detect a specified frequency of light that is backscattered through the fiber optic cable. An actuation mechanism is attached to the fiber optic cable. The actuation mechanism is configured to deform the fiber optic cable in response to a stimulus. A central processing center is configured to monitor and store data produced by the sub-surface detection devices.

Aspects of the example system, which can be combined with the example system, alone or in combination, include the following. The actuation mechanism includes an antenna configured to detect changes in an electromagnetic field. An electromechanical transducer is connected to the antenna. The electromechanical transducer is configured to deform the fiber optic cable in response to detecting changes in the electromagnetic field.

Aspects of the example system, which can be combined with the example system, alone or in combination, include the following. The actuation mechanism includes a hydrophilic gel configured to expand in the presence of moisture. A diaphragm is connected to the hydrophilic gel and the fiber optic cable. An expansion in the hydrophilic gel induces the diaphragm to deform the fiber optic cable.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1 shows a schematic diagram of an example borehole sensor system installed within a borehole.

Like reference numbers and designations in the various drawings indicate like elements.

DETAILED DESCRIPTION

Figure 2A:
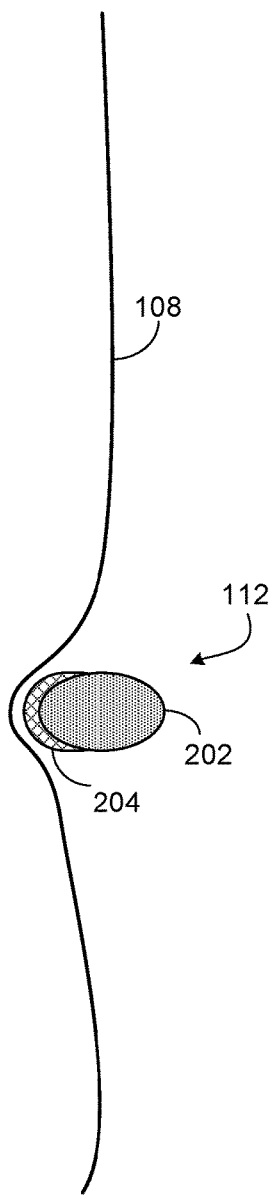
FIG. 2A shows a schematic diagram of an example moisture sensor.

Optical fibers have some limitations in regards to their use in sensors. First, detection is based exclusively on mechanical deflection of the fiber. Second, the maximum useful frequency is half of the sampling rate (Nyquist frequency) in this system and depends on the length of the fiber, or more specifically, the round trip transit time of the light from start to end and back. For example, about 6 ns per meter of length. A typical horizontal well can be about 5 km, resulting in 30,000 ns of travel time, or a sample rate of 33 kHz. A 50 km pipeline application would be limited to about a 3 kHz sampling rate. Aspects of this disclosure enable long-term, low-cost detection of acoustic/ultrasonic, electric and magnetic fields at much higher frequencies than current technology.

The disclosure is directed to extending and adapting current optical fiber distributed acoustic sensors (DAS) to frequency multiplexing. Frequency multiplexing can use multiple light sources with each having different frequency bands. Typically, frequency multiplexing can increase effective sampling rates, and thereby increase bandwidth. For the frequency multiplexing to increase bandwidth, instead of using a single frequency laser to probe the state of a distributed fiber sensor, multiple different laser frequencies are used to probe the state of the distributed fiber sensor in parallel. With frequency multiplexing, sampling rate can be increased by several times and enabling distributed sensing of radio frequencies or ultrasonic signals. The fiber optic cable can act as a data collector from multiple sensors mounted along the well path, either behind tubing, behind casing, or run in hole as an intervention based system. The sensors can have various characteristics depending on the purpose of the sensor. For sensing electric or magnetic fields, separate antennas and transducers are affixed to the side of the fiber, with the antennas receiving electric signals, magnetic signals, or both. The transducers impart a detectable, mechanical deflection to the fiber, while the DAS can provide distributed electromagnetic sensing. In addition to the electromagnetic sensing, changing moisture within a borehole can be detected as well. In some implementations, a suitable energy storage and energy harvesting system can be supplied to increase a deployable lifetime of the system.

FIG. 1 is a schematic diagram of an example sub-surface detection device 100 installed within a borehole 102 formed within a geologic formation 104. In some implementations, multiple sub-surface detection devices are installed within multiple boreholes to form a distributed geophone system. The sub-surface detection device 100 includes a variable frequency light source 106 that is configured to emit a light beam modulate at a specified frequency. A fiber optic cable 108 is attached to the variable frequency light source 106. The fiber optic cable 108 is configured to receive the light beam and guide the light beam along its length. Multiple optical detectors 110 are attached to the fiber optic cable 108 and are configured to detect backscattered light. In some implementations, each of the multiple optical detectors 110 is configured to detect a specified frequency of light that is backscattered through the fiber optic cable 108. In some implementations, each of the multiple optical detectors 110 is configured to detect a different frequency or frequency band of light. An actuation mechanism 112 is attached to the fiber optic cable 108. The actuation mechanism 112 is configured to deform, deflect, or otherwise displace the fiber optic cable 108 in response to a stimulus, which, in turn, can backscatter light. The multiple optical detectors 110 can determine the displacement based on the backscatter. In some implementations, a central processing center 114 is configured to monitor and store data produced by one or more sub-surface detection devices.

The fiber optic cable 108 can accommodate a broad band of frequencies. As a result, sweeping (modulating) the laser frequency combined with the multiple optical detectors 110 can separately determine the backscattered intensity at each frequency (or specified frequency band) separately. In addition, the modulation of the laser frequency as a function of time also allows one to effectively multiplex "N" different laser probes in parallel (where "N" is the total sweep band divided by the width of each detection band). Such multiplexing can increase a DAS detection bandwidth by several hundred times. To optimize or otherwise increase readout speed, an array of single channel detectors, interfaced via optical fibers, with a number of single channel digitizers operating in parallel can be used in some implementations. Signal processing comparing current to prior backscatter data can be performed with customized integrated circuits. By way of example, using the 5 km well mentioned above, a 100× increase in throughput using frequency multiplexing would increase the effective sampling rate to 33×100 kHz, or 3.3 MHz, which is sufficient for distributed sensing of RF or ultrasonic signals up to about 1 MHz.

FIG. 2A illustrates an example of a moisture sensor that can be utilized with aspects of this disclosure. In the illustrated example, the actuation mechanism 112 includes a hydrophilic gel 202 configured to expand in the presence of moisture. A diaphragm 204 is connected to the hydrophilic gel 202 and the fiber optic cable 108. An expansion in the hydrophilic gel 202 induces the diaphragm 204 to deform the fiber optic cable 108.

Figure 2B:
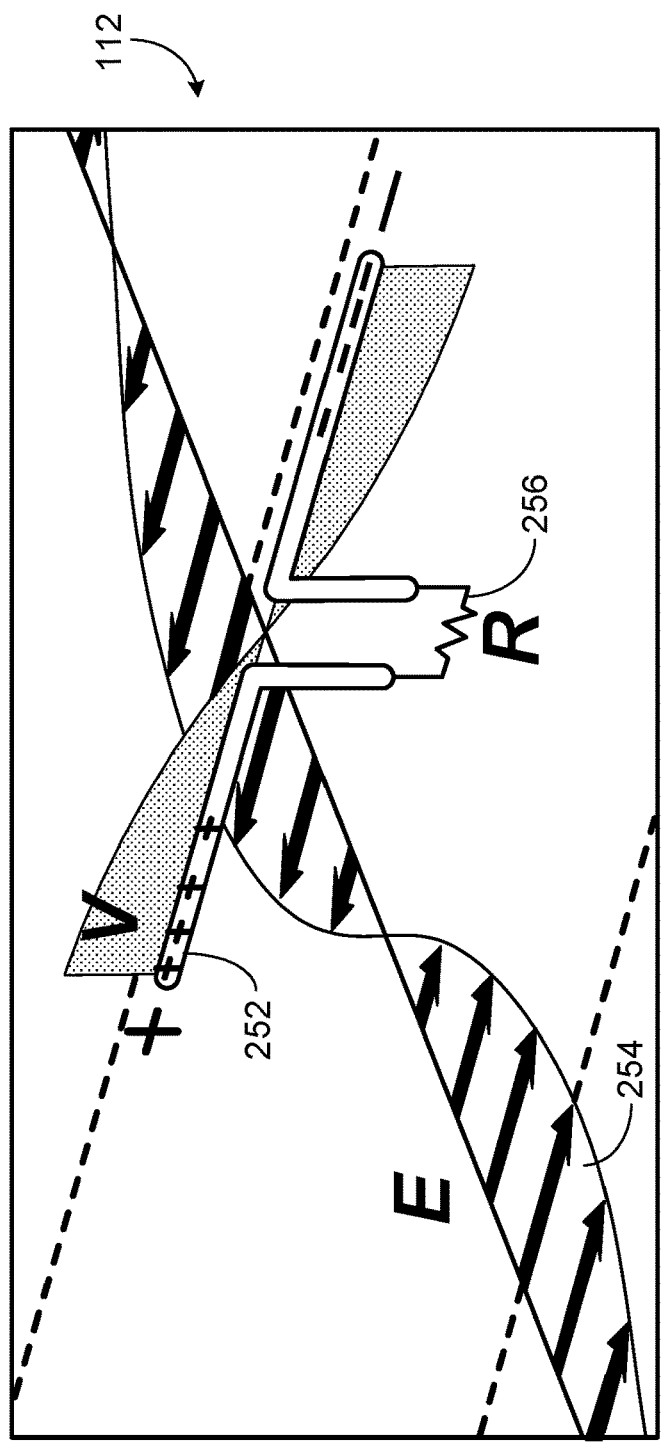
FIG. 2B shows a schematic diagram of an example of an electromagnetic sensor.

FIG. 2B illustrates an example of an electromagnetic sensor and transducer that can be utilized with aspects of this disclosure, for example, within the actuation mechanism 112. In the illustrated implementation, the actuation mechanism 112 includes an antenna 252 configured to detect changes in an electromagnetic field 254. The antenna 252 can include a dipole antenna, a ferrite loopstick, or any other antenna appropriate for the desired electromagnetic field to be measured. An electromechanical transducer 256 is connected to the antenna 252. The electromechanical transducer 256 is configured to deform the fiber optic cable 108 in response to detecting changes in the electromagnetic field 254. The electromechanical transducer 256 can include a piezoelectric element, an electrostatic diaphragm, an electrical coil with a diaphragm, or other electromechanical devices.

In some implementations, multiple actuation mechanisms 112 can be used on a single fiber optic cable 108. In such an implementation, actuation mechanisms 112 can be used on the same line. For example, an electromagnetic sensor and a moisture sensor can be used on the same line. In some implementations, multiples of the same sensor type can be used. For example, multiple electromagnetic sensors can be installed on the same fiber optic line.

Figure 3:
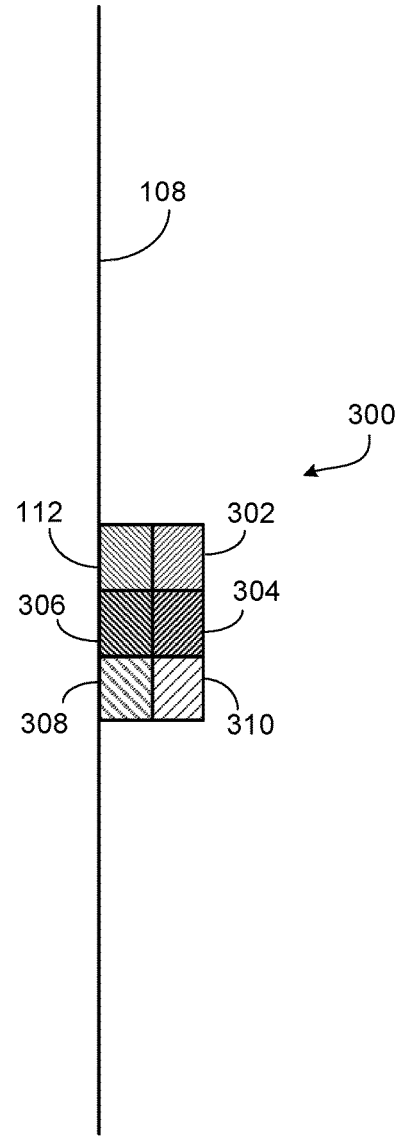
FIG. 3 shows a schematic diagram of a downhole sensor system.

FIG. 3 shows a schematic diagram of a downhole sensor system 300. In addition to the variety of components previously described, the downhole actuation mechanism can include a filtering circuit 302 configured to filter out noise detected by the antenna 252. Additionally, an amplifier 304 can be included downhole to amplify the filtered signal. The additions of the filtering circuit 302 and the amplifier 304 increases the sensitivity and accuracy of the actuation mechanism 112. In some implementations, an energy storage device 306 can be included to supply power to the amplifier 304, the filtering circuit 302, or both. The energy storage device 306 can include a battery, a capacitor, or any other energy storage device.

In some implementations, the subsurface detection device 300 includes an energy harvesting device 308 configured to harvest energy from an ambient environment and store the energy within the energy storage device 306 configured to store the harvested energy. In some implementations, the harvesting device 308 can include an antenna configured to harvest electromagnetic energy within the borehole. In some implementations, the antenna 252 shown in FIG. 2B can be used for both harvesting energy and actuating the electromechanical transducer 256. In such an implementation, a rectification circuit 310 is coupled to the antenna. The rectification circuit 310 is configured to rectify and otherwise condition the harvested energy for storage. For example, the rectification circuit 310 can convert a noisy, oscillating current into a constant, DC current that can be used to charge a battery. In such an implementation, an energy storage device 306 is coupled to the rectification circuit 310, and is configured to store the harvested energy. In some implementations, the energy storage device 306 includes a super capacitor, a battery, or any other energy storage mechanism.

In some implementations, the harvesting device 308 can include an electromechanical transducer to harvest noise energy within the borehole. In some implementations, the actuation mechanism 112 shown in FIG. 2B can be used for both harvesting energy and deforming the optical cable 108. The electromechanical transducer can include a piezoelectric device, an electrostatic transducer, an electrical coil and diaphragm, or any other electromechanical transducer. In such an implementation, the rectification circuit 310 is coupled to the electromechanical transducer. The rectification circuit 310 is configured to rectify and otherwise condition the harvested energy for storage. For example, the rectification and circuit can convert a noisy, oscillating current into a constant, DC current that can be used to charge a battery. In such an implementation, the energy storage device 306 is coupled to the rectification circuit 310, and is configured to store the harvested energy. In some implementations, the energy storage device 306 includes a super capacitor, a battery, or any other energy storage mechanism.

Figure 4:
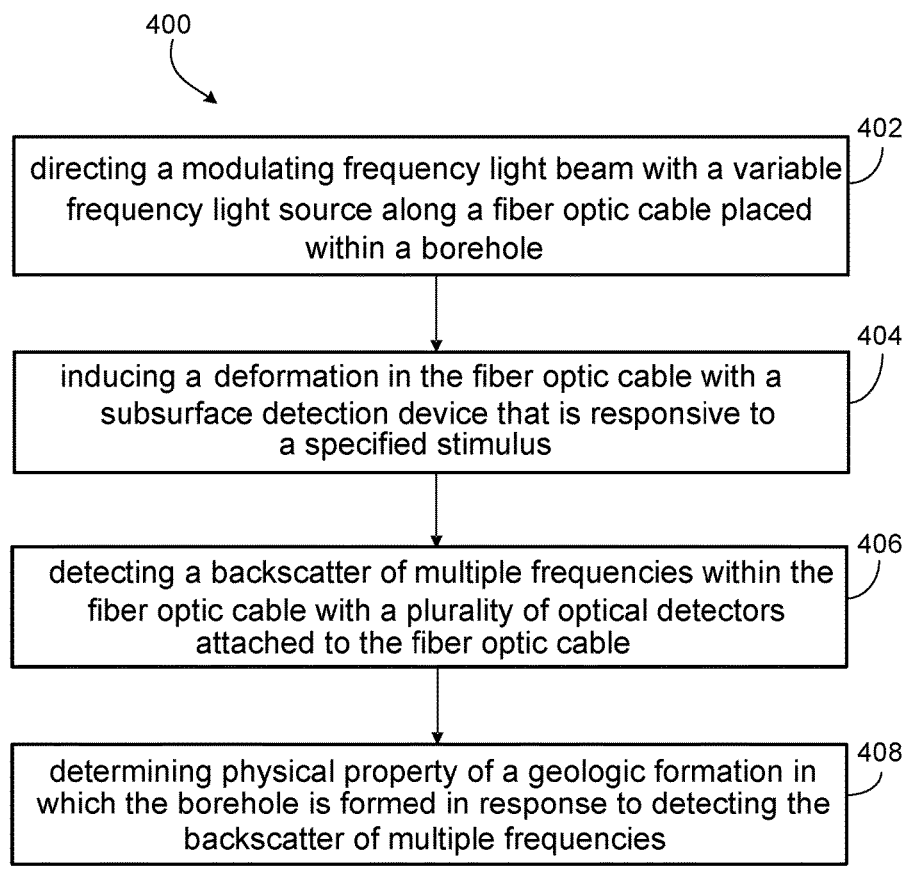
FIG. 4 is a flowchart of an example method that can be used with certain aspects of this disclosure.

FIG. 4 is a flowchart of an example method 400 that can be used with aspects of this disclosure. At 402, a light beam with a modulating frequency is directed with a variable frequency light source along a fiber optic cable 108 placed within a borehole. At 404, a deformation is induced in the fiber optic cable 108 with a subsurface detection device that is responsive to a specified stimulus, for example, the previously described moisture sensor in FIG. 2A and electromagnetic sensor in FIG. 2B. In some implementations, different subsurface detection devices can cause backscatter at specified frequencies. In some implementations, multiple actuation mechanisms 112 can be included on a single fiber optic cable. At 406, the backscatter of multiple frequencies is detected within the fiber optic cable by the multiple optical detectors 110 attached to the fiber optic cable. Each of the multiple optical detectors 110 is configured to detect a specified frequency of light. In some implementations, each of the multiple optical detectors 110 is configured to detect changes in a different frequency band. At 408, a physical property of a geologic formation in which the borehole is formed is determined in response to detecting the backscatter of multiple frequencies. For example, a change in moisture content can be determined by detecting a backscatter in a first frequency, while a change in an electromagnetic field can be determined by detecting a backscatter in a second frequency.

In implementations where an electromagnetic sensor is used, a change in an electromagnetic field is detected with the antenna 252. A current is induced in the antenna 252 by the changing magnetic fields. The electromechanical transducer 256 is actuated in response to the induced current. The fiber optic cable 108 is deformed by the electromechanical transducer 256. As previously described, the electromechanical transducer 256 can include a piezoelectric element, an electrostatic diaphragm, an electrical coil with a diaphragm, or any other electromechanical device.

In implementations where a moisture sensor is used, a hydrophilic gel expands in response to a moisture content within the borehole. The deformation within the fiber optic cable is induced when the expanded hydrophilic gel deforms a diaphragm 204 that is attached to the fiber optic cable 108. The diaphragm can include an elastomer that is appropriate for service within a wellbore. That is, the elastomer is chemically inert and resistant to temperatures found within the borehole 102. For example, Teflon, Viton, or any other inert elastomer can be used.

In implementations where electromagnetic energy is harvested from changes in magnetic fields within the borehole, the energy is harvested with an antenna, such as antenna 252. In such an instance, the harvested energy is conditioned and stored within the energy storage device 306. Downhole equipment, such as the actuation mechanism 112, can be powered with the stored energy.

In implementations where energy from ambient noise within the borehole is harvested, the energy is harvested with a transducer, then conditioned and stored within the energy storage device 306. Downhole equipment, such as the actuation mechanism 112, can be powered with the stored energy.

Regardless of what energy harvesting mechanism is used, the energy storage device 306 in which the harvested energy is stored can be a battery, a super capacitor, or any other energy storage device.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A sub-surface detection device comprising:
   a variable-frequency light source configured to emit a light beam and modulate a frequency of the light beam;
   a fiber optic cable attached to the variable frequency light source, the fiber optic cable configured to receive the light beam at an inlet and pass the light beam to an exit;
   a plurality of optical detectors attached to the fiber optic cable, each of the optical detectors configured to detect a specified frequency of light that is backscattered through the fiber optic cable; and
   an actuation mechanism attached to the fiber optic cable, the actuation mechanism configured to deform the fiber optic cable in response to a stimulus;
   wherein the actuation mechanism comprises:
   a hydrophilic gel configured to expand in the presence of moisture; and
   a diaphragm connected to the hydrophilic gel and the fiber optic cable, wherein an expansion in the hydrophilic gel induces the diaphragm to deform the fiber optic cable.

2. The sub-surface detection device of claim 1, wherein each of the plurality of optical detectors is configured to detect a different frequency of light.

3. The sub-surface detection device of claim 1, wherein the actuation mechanism comprises:
   an antenna configured to detect changes in an electromagnetic field; and
   an electromechanical transducer that is connected to the antenna, the electromechanical transducer configured to deform the fiber optic cable in response to detecting changes in the electromagnetic field.

4. The sub-surface detection device of claim 3, wherein the electromechanical transducer comprises a piezoelectric element.

5. The subsurface detection device of claim 3, further comprising:
   a filtering circuit configured to filter out noise detected by the antenna;
   an amplifier configured to amplify the filtered signal; and
   an energy storage device configured to supply power to at least one of the amplifier or the filtering circuit.

6. The subsurface detection device of claim 5, wherein the energy storage device comprises a battery or capacitor.

7. The subsurface detection device of claim 6, wherein the energy harvesting device comprises:
   an antenna configured to harvest electromagnetic energy within the borehole;
   a rectification circuit coupled to the antenna, the rectification circuit configured to condition the harvested energy for storage; and
   an energy storage device coupled to the rectification circuit, the energy storage device configured to store the harvested energy.

8. The subsurface detection device of claim 6, wherein the energy harvesting device comprises:

a piezoelectric device configured to harvest mechanical energy within the borehole;

a rectification circuit coupled to the piezoelectric device, the rectification circuit configured to condition the harvested energy for storage; and an energy storage device coupled to the rectification circuit, the energy storage device configured to store the harvested energy.

9. The subsurface detection device of claim 1, further comprising:

an energy harvesting device configured to harvest energy from an ambient environment; and an energy storage device configured to store the harvested energy.

* * * * *